United States Patent
Neely, Jr.

(10) Patent No.: US 6,589,661 B2
(45) Date of Patent: Jul. 8, 2003

(54) CURABLE COATING COMPOSITIONS FOR STAINLESS STEEL

(75) Inventor: James E. Neely, Jr., Butler, PA (US)

(73) Assignee: Neely Industries, Inc., Butler, PA (US)

( * ) Notice: Subject to any disclaimer, the term of this patent is extended or adjusted under 35 U.S.C. 154(b) by 7 days.

(21) Appl. No.: 09/998,485

(22) Filed: Nov. 30, 2001

(65) Prior Publication Data

US 2002/0034650 A1 Mar. 21, 2002

Related U.S. Application Data

(63) Continuation-in-part of application No. 09/619,335, filed on Jul. 19, 2000, now Pat. No. 6,428,616.

(51) Int. Cl.$^7$ .......................... B32B 15/04; B32B 31/00; C04B 12/04
(52) U.S. Cl. ...................... 428/457; 106/623; 106/626; 106/628; 106/629; 106/630; 106/631; 106/632; 427/397.8; 427/421; 427/428; 428/450; 428/688; 428/923
(58) Field of Search .................................. 428/457, 450, 428/688, 923; 427/397.8, 421, 428; 106/623, 626, 628, 629, 630, 631, 632

(56) References Cited

U.S. PATENT DOCUMENTS

| | | | |
|---|---|---|---|
| 4,288,252 A | 9/1981 | Neely | 106/629 |
| 5,498,284 A | 3/1996 | Neely, Jr. | 106/629 |
| 6,428,616 B1 * | 8/2002 | Neely, Jr. | 106/628 |

OTHER PUBLICATIONS

ASTMB 117–97, "Standard Practice for Operating Salt Spray (Fog) Apparatus," ASTM, West Conshohocken, Pennsylvania, 1997. (No Month Given).

* cited by examiner

Primary Examiner—Robert R. Koehler
(74) Attorney, Agent, or Firm—Webb Ziesenheim Logsdon Orkin & Hanson, P.C.

(57) ABSTRACT

An aqueous, curable coating composition comprising a mixture of: (a) at least one water-soluble alkali metal silicate and (b) an effective amount of a water-soluble crosslinking agent comprising an alkali metal aluminophosphate, or an alkali metal aluminoborophosphate, or an ammonia aluminophosphate, or an ammonia aluminoborophosphate, or an alkali metal ammonia aluminophosphate, an alkali metal ammonia aluminoborophosphate, or a mixture of two or more of the foregoing phosphates. The coating composition will often not contain any visually discernible precipitate. The coating composition may be applied to a substrate, such as a glass, a ceramic, concrete or a metal and thereafter cured by air drying or by heating to a temperature of up to about 240° C. (or higher, if desired).

52 Claims, No Drawings

CURABLE COATING COMPOSITIONS FOR STAINLESS STEEL

CROSS-REFERENCE TO RELATED APPLICATION

This application is a continuation-in-part of U.S. patent application Ser. No. 09/619,335, filed Jul. 19, 2000, now U.S. Pat. No. 6,428,616, and entitled "Curable Coating Compositions."

FIELD OF THE INVENTION

The invention relates to inorganic and organic-modified inorganic curable coating compositions. More particularly, the invention provides aqueous, curable coating compositions comprising a mixture of a water-soluble alkali metal silicate and a water-soluble crosslinking agent. The compositions are particularly useful for coating glass, ceramic, concrete and metal articles.

BACKGROUND OF THE INVENTION

Aqueous alkali metal or ammonium silicate compositions containing curing agents are well known, for example, see U.S. Pat. No. 4,288,252. In general, the prior art uses alkali metal silicates that are crosslinked with beta-form aluminum trimetaphosphate. Crosslinking of the alkali metal silicate is attained by heating an article coated with the aqueous composition to a temperature of 205° C. or higher.

The aqueous prior art composition is typically made by mixing an alkali metal silicate with fillers and/or pigments and placing the mixture in a sealed container. The beta-form aluminum trimetaphosphate is mixed in water with or without pigments and fillers and stored in a second sealed container. Prior to use, the materials in each container are mixed together. The separate containers are required since the beta-form aluminum trimetaphosphate and alkali silicates undergo a non-crosslinking reaction even at room temperature to produce a solidified mass within about one day. Once the materials from the separate containers are mixed, the resultant composition must be used within eight hours. Thus, this system must be prepared as a two-pack system to prevent this undesirable reaction.

An aqueous, heat-curable coating composition may also be prepared in accordance with U.S. Pat. No. 5,498,284. In the '284 patent, the composition comprises a mixture of a water-soluble alkali silicate and an alkali aluminum phosphate crosslinking agent. However, the crosslinking agent in the '284 patent is difficult and time-consuming to prepare, and it is not water-soluble, leading to variable results upon curing due to lack of homogeneity of distribution of the cross linking agent in the mixture. Furthermore, the coating composition in the '284 patent must be heat-cured at temperatures of up to about 700° C. In contradistinction thereto, the crosslinking agents employed in the present invention are easily prepared, they are water-soluble thus leading to a clear solution upon admixture with the alkali metal silicate, and the coating composition may be readily cured by air drying or by moderate heating, i.e., temperatures above about 240° C. are not necessary for heat curing.

It would, therefore, be desirable to prepare an aqueous coating composition that is curable by drying in air or by moderate heating, at temperatures of up to about 240° C. or higher if desired.

It would also be desirable to prepare an aqueous coating composition that is a clear solution such that the alkali metal silicate and the crosslinking agent are both water-soluble and are fully compatible with one another, thereby avoiding problems associated with a lack of homogeneity of distribution of the crosslinking agent in the alkali metal silicate.

Further, it would be desirable to prepare a crosslinking agent by a simple, highly efficient process that will result in a water-soluble material that will be fully compatible with the alkali metal silicate.

SUMMARY OF THE INVENTION

The present invention is directed to an aqueous, curable coating composition comprising a mixture of a water-soluble alkali metal silicate and a water-soluble crosslinking agent.

The present invention avoids the use of beta-form aluminum trimetaphosphate hardener or other curing or hardening agents that have been previously employed and that have an undesirable low temperature reaction with the alkali silicates. In the present invention, it is possible to formulate the composition as a one-pack system since there is no significant low temperature, e.g., room temperature, reaction between the alkali silicate and the crosslinking agent employed in the mixture. This permits the formulation of curable coating compositions as a single container system with a long shelf life. The container should, of course, be sealed until the coating composition is to be applied to the substrate since the composition is capable of being cured at room temperature by air drying (as well as by moderate heating).

Since the coating composition of the present invention employs the use of a water-soluble crosslinking agent, the problems associated with the composition of the '284 patent discussed above may be avoided.

DETAILED DESCRIPTION OF THE PREFERRED EMBODIMENT

Other than in the operating examples, or where otherwise indicated, all numbers or expressions referring to quantities of ingredients, reaction conditions, etc., used in the specification and claims are to be understood as modified in all instances by the term "about."

The present invention provides aqueous, curable coating compositions comprising at least one water-soluble alkali metal silicate and a water-soluble crosslinking agent. The present invention also provides the method for producing and using such coating compositions. The invention further provides the water-soluble crosslinking agents and the method for their production. Additionally, the invention provides substrates that are coated with the coating composition and subsequently cured.

The aqueous, curable coating compositions of the invention comprise, in addition to water as the only necessary solvent, a mixture of:

(a) at least one water-soluble alkali metal silicate; and (b) an effective amount of a water-soluble crosslinking agent comprising an alkali metal aluminophosphate, an alkali metal aluminoborophosphate, an ammonia aluminophosphate, an ammonia aluminoborophosphate, an alkali metal ammonia aluminophosphate, an alkali metal ammonia aluminoborophosphate or a mixture of two or more of the foregoing phosphates.

The alkali metal silicates employed herein are those that have been previously known for use in the formulation of silicate coating compositions. See, for example, U.S. Pat. No. 4,288,252. Although any alkali metal may be employed for the preparation of the silicate and the crosslinking agent, it is preferred that the alkali metal of the water-soluble alkali metal silicate and each of the alkali metals of the water-soluble crosslinking agent independently are sodium, potassium or lithium.

The water-soluble crosslinking agent employed in this invention may be prepared as follows: an aluminum phosphate, e.g., aluminum dihydrogen phosphate, is reacted in water with at least one alkali metal phosphate (e.g., sodium phosphate, potassium phosphate, lithium phosphate or mixtures thereof) at room temperature. To prepare the ammonia aluminophosphate, ammonia is substituted for the alkali metal phosphate. To prepare the alkali metal ammonia aluminophosphate, a mixture of the alkali metal phosphate (s) and ammonia is used to react with the aluminum phosphate. To prepare the corresponding alkali metal aluminoborophosphate or the corresponding ammonia aluminoborophosphate, a suitable boron compound, such as boric acid, is also employed as a reactant.

The crosslinking reaction of the aluminum phosphate with the alkali metal phosphate and/or ammonia as well as the reaction of the aluminum phosphate with the alkali metal phosphate and/or ammonia and the boron compound, in water proceeds rapidly, e.g., in 1–5 minutes, at ambient temperature. The crosslinking agent preferably is not isolated, i.e., the aqueous solution of the crosslinking agent is used as is for subsequent mixing with the water-soluble alkali metal silicate. The water-soluble alkali metal silicate may be mixed as a solid or as an aqueous solution with the aqueous solution of the crosslinking agent to thereby form the aqueous, curable coating composition of the present invention.

The amounts of the reactants employed in the preparation of the aqueous solution of the crosslinking agent will be approximately stoichiometric in nature. However, it is preferred that the amounts of the reactants be such that the pH of the aqueous solution of the crosslinking agent will be above about 5.0, preferably above 7.0. It is also preferred that the amounts of the reactants employed in the preparation of the aqueous solution of the crosslinking agent be such that the resultant solution is "clear" in appearance. For the purpose of this invention, the term "clear" should be understood as meaning that the solution may have a visually transparent or a visually cloudy appearance, but there are no visibly discernible solids present in the solution, i.e., either in suspension or as a precipitate.

The weight ratio of solids of the water-soluble alkali metal silicate to the water-soluble crosslinking agent is in the range of about 3:1 to about 500:1, preferably 10:1 to 100:1. The amount of water present in the composition is not critical; the amount of water used will determine the viscosity of the composition that may be varied to meet the requirements of the selected method of application of the composition on the desired substrate. Typically, the water will be present in the range of about 25 to about 95 wt. %, preferably 45 to 75 wt. %, based on the weight of the composition.

An effective amount of the water-soluble crosslinking agent is any amount that will enable it to harden or cure the water-soluble alkali metal silicate. The active solids of the curing composition includes the alkali metal silicate and the water-soluble crosslinking agent. Typically, the active solids will be present in the range of about 5 to about 75 wt. % based on the total weight of the coating composition.

The coating composition of the invention is easily applied to any substrate, e.g., a glass, a ceramic, concrete or a metal. The resultant coated substrate may then be cured by air drying or by moderate heating. The time required for curing will be somewhat dependent upon the concentration of the solids in the aqueous solution and also dependent upon the ambient temperature and relative humidity in the case of air drying or the temperature and the mass of the substrate in the case of heat-curing. Typically, the time for achieving a complete cure will range from several minutes to 2–3 hours in the case of curing by air drying, while heat-curing will typically require a curing time of several minutes to about one hour. The degree and speed of curing of the coated substrate may be enhanced by passing an air stream over the coated substrate, e.g., with a fan. A temperature sufficient to cure the coating composition is any temperature at which the crosslinking reaction will take place. The optimum degree of durability of the coating is achieved by heat-curing the coated substrate. The temperature utilized for heat-curing is not critical. It has been found that the heat-curing temperature need not exceed about 240° C. However, heat-curing temperatures in excess of 240° C. are possible, particularly if the manufacturing operations associated with the production of coated substrates typically employ such higher temperatures. For example, when the present coating composition is applied to stainless steel, the heat-curing temperature will often be at least 240° C. and can be as high as 1,000° C.

A wide variety of coatings with a variety of properties may be readily achieved by incorporating one or more materials in the aqueous, curable coating compositions of the present invention. Such materials, if present, preferably should not be present in an amount of greater than about 90 wt. %, based on the weight of the composition. Useful materials for incorporation in the coating compositions of the invention include one or more resins, one or more fillers, one or more inorganic pigments, one or more organic pigments, one or more dyes, one or more surfactants, one or more defoamers and one or more coupling agents. These materials should, of course, be stable at the curing temperature employed when the coating composition is applied to the substrate and subsequently cured.

For the purpose of the present invention, the term "resins" should be understood to mean polymeric entities that may range from low molecular weight oligomers to high molecular weight complex polymers and from low viscosity mobile liquids to plastic solids. The resins may be thermoplastic, thermosetting, elastomeric or thermoplastic-elastomeric in nature and may be incorporated in the coating composition of the invention neat or as a solution or dispersion of the polymeric entity in an aqueous or non-aqueous, non-reactive solvent that will be compatible with the components of the coating composition (typical solvents would include water, glycols, hydrocarbons, etc.). Such resins may be used in the amount of about 1 to about 90 wt. %, preferably 5 to 30 wt. %, based on the weight of the composition. Suitable resins include polyolefins, such as polyethylene and polypropylene, ethylene-propylene copolymers, ethylene-propylene-diene monomer terpolymers, nylons, polycarbonates, poly(meth)acrylates, polyesters, epoxy resins, alkyd resins, hydrocarbon resins, vinyl resins, etc.

In addition to, or in lieu of the resins, one or more fillers may be added to the coating compositions of the invention. Such fillers may be used in amounts of up to about 60 wt. %, preferably up to 50 wt. %, based on the weight of the composition. The fillers may be naturally occurring minerals or man-made oxides or other inorganic materials. Suitable fillers include talc, silica, feldspar, mica, wallstonite, alumina, zirconia, graphite, silicon carbide, oxide glasses, silver, steel, iron and the like.

In addition to, or in lieu of the resins and/or the fillers, one or more inorganic pigments may be added to the coating compositions of the invention. Such inorganic pigments may be used in amounts of up to about 50 wt. %, based on the weight of the composition. Suitable inorganic pigments include ferrous/ferric oxide, ferric oxide, titanium dioxide, copper chromite, manganese ferrite, chromium hematite, cobalt-zinc aluminate, zinc oxide, carbon black, zinc sulfide, calcium carbonate, hydrated aluminum silicate, copper powder and the like.

In addition to, or in lieu of the resins, fillers and/or the inorganic pigments, one or more organic pigments may be added to the coating compositions of the invention. Such organic pigments may be used in amounts of up to about 40 wt. %, based on the weight of the composition. Suitable organic pigments include the mono-and diarylide yellows, dinitroaniline orange, pyrazolone orange, diarylide orange, the naphthol reds, toluidine red, the rubine reds, the lithol reds, pmta deep green, phthalocyanine green, pmta brilliant blue, the phthalocyanine blues, copper ferrocyanide blue, ultramarine violet, crystal violet, dioxazine violet b and the like.

The coating compositions of the invention may also include minor amounts, e.g., about 0.1 to about 5 wt. %, based on the weight of the composition of one or more dyes, such as acid dyes, azoic dyes, basic dyes, direct dyes, disperse dyes, mordant dyes, natural dyes, solvent dyes, sulfur dyes, vat dyes and the like. The coating compositions may also contain very minor amounts, e.g., about 0.001 to about 1 wt. %, based on the weight of the composition, of one or more surfactants and/or one or more defoamers (or materials having both surfactant and defoaming properties) and/or one or more coupling agents. The surfactants may be of the anionic, cationic, nonionic and/or amphoteric types. Suitable defoamers include non-silicone as well as the preferred silicone fluids and emulsions. Coupling agents are well known in the prior art and typically comprise organosilanes, organotitanates and organozirconates.

The coating compositions of the present invention may include one or more pigments. Suitable pigments include, but are not limited to, ferrous/ferric oxide, ferric oxide, titanium dioxide, copper chromite, manganese ferrite, chromium hematite, cobalt-zinc aluminate, zinc oxide, carbon black, zinc sulfide, graphite, calcium carbonate, hydrated aluminum silicate, copper powder, and the like. Pigments may be present in the coating composition at up to 60 wt. %, often up to 30 wt. %, and in come cases, up to 20 wt. %. When pigments are present, they are included in the coating composition at a level of at least 0.1 wt. %, often at least 1.0 wt. %, and in some cases, at least 5 wt. %. Pigments may be present in any range of valves inclusive of those stated above.

The coating compositions of the invention have been found to be particularly suitable as functional or decorative coatings for glass, ceramic, concrete and metal substrates. The coating compositions of the invention may be applied to the selected substrate by conventional methods, such as spraying, brush coating, roll coating, screen printing, etc., and the resultant coated substrate may then be cured by air drying at room temperature or by heating to a temperature of up to about 240° C. as discussed above. In accordance with recognised coating techniques, the surface of the selected substrate should be clean, i.e., free from cutting oils, greases, fingerprints, dust, etc., prior to application of the coating composition of the invention.

In an embodiment of the present invention, the coating compositions are applied to stainless steel. Any type of stainless steel, such as austenitic, ferritic or martensitic, may be used in the present invention. Stainless steel alloys that may be used include, but are not limited to, 304 stainless steel, 316 stainless steel, and 409 stainless steel.

When used to coat stainless steel, the aqueous, curable coating composition will include at least one water-soluble alkali metal silicate, an effective amount of a water-soluble crosslinking agent, water and optionally, calcium carbonate, pigments, dyes, defoamers, graphite, wetting agents, lubricating additives, water-repellent additives, fillers, resins, conductors and humectants.

Suitable fillers include talc, silica, feldspar, mica, wallsonite, alumina, zirconia clays, graphite, silicon carbide, oxide glasses, silver, steel, iron, and the like.

Micas include the general family of minerals, which are hydrous silicates of aluminum and potassium, often containing magnesium, ferrous iron, ferric iron, sodium and lithium, and in some cases, containing barium, chromium and fluorine. Silicas include the various forms of silicon dioxide. Silicas may be present in the coating composition at up to 10 wt. % and often up to 5 wt. %. Clays include various fine-grained, earthy materials that become plastic when wet, typically containing hydrous aluminum silicates and various impurities, such as potassium, sodium, calcium, magnesium and/or iron. Clays that can be used in the present invention include kaolin, montmorillonites, such as bentonite, the hydrated aluminum-magnesium silicate or attapulgite clays and illites. Any one or combination of fillers may be present in the coating composition at up to 60 wt. %, often up to 30 wt. % and in some cases up to 20 wt. %. When fillers are present, they are included in the coating composition at a level of at least 0.1 wt. %, often at least 1 wt. % and in some cases at least 5 wt. %. Fillers may be present in any range of values inclusive of those stated above.

Graphite includes all allotropic forms of carbon. Graphite may be present in the coating composition at up to 5 wt. % and often up to 3 wt. %. When graphite is present, it is included in the coating composition at a level of at least 0.1 wt. %, often at least 0.5 wt. %. Graphite may be present in any range of values inclusive of those stated above.

Wetting agents include any material that aids the ability of water to spread or "wet" a surface. Wetting agents include, but are not limited to, surfactants, defoamers, phosphates, silicone fluids, coupling agents, phosphonates, sulfates, sulfonates, fatty acids, fluoro-compounds, silicon containing compounds and their derivatives. Surfactant wetting agents include non-ionic, cationic, anionic, amphoteric and zwitterionic surfactants. Wetting agents may be present in the coating composition at up to 1 wt. % and often up to 0.5 wt. %. When wetting agents are present, they are included in the coating composition at a level of at least 0.001 wt. %, often at least 0.1 wt. %. Wetting agents may be present in any range of values inclusive of those stated above.

Specific wetting agents that may be used in the present invention include, but are not limited to, silicone-based Q2-5211 super wetting agent is available from Dow Corning, Midland, Mich.; the fluorosurfactants are commercially available under the trade name Fluorad® from the 3M Company, St. Paul, Minn.; the fluoropolymers are commercially available under the trade name Zonyl® from E. I. du Pont de Nemours and Company, Wilmington, Del.; the silicone based wetting agents available are commercially under the trade name Silwet® from Loveland Industries, Cambs, United Kingdom and the polysiloxane surfactants are available under the trade name CoatOSil® from Crompton Corporation, Greenwich, Conn.

Lubricating additives include any additives that decrease the energy required to form or work the coated stainless steel. Lubricating additives include graphite, waxes, hexagonal boron nitride, hydrocarbon based additives, fatty acid amides, esters, alcohols, metallic soaps and inorganic substances, as well as fluorine containing compounds and polymers. Lubricating additives may be present in the coating composition at up to 10 wt. % and often up to 5 wt. %. When lubricating additives are present, they are included in the coating composition at a level of at least 0.1 wt. %, often at least 0.5 wt. %. Lubricating additives may be present in any range of values inclusive of those stated above.

Humectants that can be used in the present invention include a variety of compounds that promote retention of moisture. Humectants that can be used to replace water in the coating composition of the present invention include, but are not limited to, glycerin, propylene glycol, polyols, lactic acid, glycolic acid, urea, hydrolyzed proteins, citric acid and salicylic acid. The humectants may be present in the present coating composition at a level of up to 70 wt. %, often up to 50 wt. %. When used in the coating composition, the humectants may be present at greater than 1 wt. %, often greater than 10 wt. % and in some cases greater than 30 wt. %. The humectants may be present in any range of values inclusive of those stated above.

As a non-limiting example of how a humectant may be used in the present invention, the humectant may be added to the coating composition, which is subsequently heated to evaporate and remove the desired amount of water. The resulting coating composition will be slower to dry than coating compositions that do not contain a humectant.

In an embodiment of the present invention, all or all except for traces of water (less than 1 wt. %) may be removed from the present coating composition and replaced with a suitable low vapor pressure liquid. The water is typically removed through evaporation. Examples of suitable low vapor pressure liquids include, but are not limited to suitable polyols, such as glycerine, ethylene glycol, propylene glycol, diethylene glycol, dipropylene glycol, and mixtures thereof. The low vapor pressure liquid is included at the same levels at which water would be used.

Conductors include any material that may be added to the present coating composition to aid in conducting electricity or heat. Specific conducting additives include, but are not limited to, metal powders, such as copper, iron and aluminum. Conductors may be present in the coating composition at up to 20 wt. % and often up to 50 wt. %, many times up to 60 wt. %, and often up to 70 wt. %. When conductors are present, they are included in the coating composition at a level of at least 1 wt. %, often at least 10 wt. %. Conductors may be present in any range of values inclusive of those stated above. Conductors are included in the coating composition to aid in conducting electricity in the coated stainless steel substrate. This can be advantageous, for example, in welding the coated stainless steel.

In other embodiments of the present invention, it is desirable that the coating composition be an insulating layer and prevent the coated stainless steel composition from conducting electricity. In this embodiment, the coating composition will not include conductors.

The stainless steel to be coated can be in any useful form or shape. Often, the stainless steel will be in the form of a rolled sheet. When in a sheet from, the stainless steel will have a thickness of at least 0.01 inches and will often be at least 0.03 inches. The thickness of the stainless steel sheet will usually not be greater than 1 inch and will often not exceed 0.7 inches. The thickness of the stainless steel may be any range of values inclusive of those stated above.

When applied to stainless steel, the coating composition will form a final film that is at least 0.1 mil thick, often at least 0.2 mil thick and typically at least 0.5 mil thick. A film that is too thin will wear away prematurely, exposing the stainless steel to the atmosphere and potentially causing problems, such as corrosion or loss of coating insulating properties. The final film is not more than 5 mil thick and is often 4 mil thick. In some instances, the final film is not more than 3 mil thick and can typically be not more than 2 mil or 1 mil thick. It is often not economical to apply a film that is too thick, as the benefits of the film do not improve above the stated thickness. The thickness of the coating film formed on stainless steel may be any range of values inclusive of those stated above.

The coated stainless steel of the present invention can be used in any application where stainless steel is typically used. Examples of applications where the present coated stainless steel can be used include, but are not limited to, automotive body parts, automotive exhaust system parts, appliance parts, such as refrigerators, ranges and dishwashers, architectural stainless steel, such as siding and roofing, and structural stainless steel. The coating composition can act as an electrical insulating coating on the stainless steel and be useful for face plates and for use in computers, for example in computer parts such as disc drives. The present coating composition can be used as the only coating on the stainless steel; it may be used as an under coating, such as a primer, sealer or corrosion protective coating, which prevents corrosion, or the present coating may be used as a top coat. When applied to stainless steel, the present coating composition is typically applied by roll coating with an appropriate roll coating apparatus or spray coated with an appropriate spray coating apparatus. A particular advantage of the present coating composition is its ability to minimize the appearance of fingerprints on the coated article.

A further advantage of the present coating composition is that it may be applied before and/or after the stainless steel is formed, drawn, worked, cut, scratched, welded or otherwise processed. For example, when stainless steel is cut or welded, a portion of the exposed, coated substrate steel is no longer coated. The present coating composition can be applied after processing the stainless steel to protect it.

Another advantage of the present coating composition when applied to stainless steel is that the coating composition can provide lubricity or friction reduction properties. In this case, when the coated stainless steel is formed, bent or worked, the amount of energy required and the occurrence of damage to the stainless steel surface due to cracks and crazing is reduced.

Additionally, when a humectant is included in the present coating composition, the coating composition can be applied by silk screening techniques. Silk screening application techniques can be useful for applying the present coating composition onto formed stainless steel articles, such as, for example, hub caps.

The coated stainless steel of the present invention has been found to pass the stringent requirements of various commercial users. For example, the stainless steel coated as described herein meets the requirements General Motors Corporation, Detroit, Mich.

The present invention is more particularly described in the following examples, which are intended to be illustrative only, since numerous modifications and variations therein will be apparent to those skilled in the art. Unless otherwise specified, all parts and percentages are by weight.

EXAMPLE 1

A water-soluble crosslinking agent was prepared by stirring 15 g of a 50% solution of aluminum dihydrogen phosphate with 15 g of sodium pyrophosphate in 200 g of water at room temperature until a clear solution was obtained.

EXAMPLE 2

Example 1 was repeated, except that 11.6 g of a 50% solution of aluminum dihydrogen phosphate, 10 g of boric acid and 30 g of sodium tripolyphosphate in 130 g of water were stirred together at room temperature to form a clear solution.

EXAMPLE 3

Example 1 was repeated, except that stoichiometric quantities of a 50% solution of aluminum dihydrogen phosphate and a 30% solution of ammonium hydroxide were stirred together at room temperature to form a clear solution.

EXAMPLE 4

Example 2 was repeated, except 24 g of a 30% solution of ammonium hydroxide were substituted for the sodium tripolyphosphate and the amount of water was 300 g.

EXAMPLE 5

Example 1 was repeated using 20 g of a 50% solution of aluminum dihydrogen phosphate, 10 g of sodium pyrophosphate and 12 g of a 30% solution of ammonium hydroxide in 250 g of water.

EXAMPLE 6

Example 1 was repeated using 11.6 g phosphate, 10 g of boric acid, 8 g of sodium tripolyphosphate and 6 g of a 30% solution of ammonium hydroxide in 130 g of water.

EXAMPLE 7

A curable coating composition was prepared by mixing 240 g of a potassium silicate solution having a silica/alkali oxide ratio of 2.5/1 with 19 g of the crosslinking agent solution prepared in Example 4, together with 55 g of water, 10 g of silica and 15 g of alumina. The resultant coating composition was applied to a glass substrate, and the coated substrate was heated in an oven at 240° C. for 30 minutes to produce a durable coated glass article.

EXAMPLE 8

A curable coating composition was prepared by mixing 160 g of a potassium silicate solution having a silica/alkali oxide ratio of 2.5/1 and 80 g of a sodium silicate solution having a silica/alkali oxide ratio of 4/1 with 10.3 g of the crosslinking agent solution prepared in Example 2, together with 50 g of water, 30 g of silica and 40 g of alumina. The resultant coating composition was applied to a glass substrate, and the coated substrate was cured by heating in an oven at 240° C. for 20 minutes.

EXAMPLE 9

A curable coating composition was prepared by mixing 240 g of a potassium silicate solution having a silica/alkali oxide ratio of 2.5/1 with 9 g of the crosslinking agent solution prepared in Example 6, together with 5 g of silica, 10 g of alumina and 2 g of clay. The resultant coating composition was applied to a glass substrate and the coated substrate was cured by heating in an oven at 200° C. for 20 minutes.

EXAMPLE 10

A curable coating composition may be prepared by mixing 120 g of a potassium silicate solution having a silica/alkali oxide ratio of 2.5/1 and 100 g of a sodium silicate solution having a silica/alkali oxide ratio of 4/1 with 25 g of the crosslinking agent solution prepared in Example 1, 40 g of water, 12 g of silica, 20 g of one or more inorganic pigments, 5 g of one or more organic pigments and a total of up to 1 wt. % of one or more surfactants, defoamers and/or coupling agents. The resultant coating composition may be applied to substrates to produce colored-coated substrates which may then be cured by air drying or heating, e.g., to a temperature of up to 240° C. (or higher, if desired).

EXAMPLE 11

A curable coating composition was prepared by mixing 240 g of a potassium silicate solution having a silica/alkali oxide ratio of 2.5/1 with 19 g of the crosslinking agent solution prepared in Example 4, together with 60 g of water, 16 g of mica, 10 g of silica, 10 g of a ferrous/ferric oxide black pigment, 2 g of graphite and 0.1 g of Q2-5211 wetting agent. The resultant coating composition was applied to a stainless steel substrate and the coated substrate cured by heating in an oven at 240° C. for 20 minutes.

EXAMPLE 12

A curable coating composition was prepared by mixing 160 g of a potassium silicate solution having a silica/alkali oxide ratio of 2.5/1 and 80 g of a sodium silicate solution having a silica/alkali ratio of 4/1 with 10 g of the crosslinking agent solution prepared in Example 2, together with 50 g of water, 16 g of mica, 30 g of a copper chromite oxide black pigment, 4 g of graphite and 0.1 g of Q2-5211 wetting agent. The resultant coating composition was applied to a stainless steel substrate and the coated substrate cured by heating in an oven at 240° C. for 30 minutes.

EXAMPLE 13

A curable coating composition was prepared by mixing 240 g of a potassium silicate solution having a silica/alkali oxide ratio of 2.5/1 with 19 g of the crosslinking agent solution prepared in Example 4, together with 74 g of an alkali siliconate solution, 10 g of silica, 3 g of clay and 35 g of a copper chromite oxide black pigment. The resultant coating composition was applied to a stainless steel substrate and the coated substrate cured by heating in an oven at 240° C. for 20 minutes.

EXAMPLE 14

A slow drying alkali silicate was prepared by mixing 240 g of a potassium silicate solution having a silica/alkali oxide ratio of 2.5/1 with 100 g of glycerin and heating the mixture while stirring until 100 g of water evaporated from the mixture. A curable coating composition was prepared by adding to this reduced-water silicate 19 g of the crosslinking agent solution prepared in Example 4, together with an additional 50 g of glycerin, 60 g of a copper chromite oxide black pigment, 10 g of silica and 3 g of clay. The resultant coating composition was applied to a steel substrate and the coated substrate cured by heating in an oven at 240° C. for 30 minutes.

EXAMPLE 15

Bend Test

Stainless steel samples coated as described in examples 11–14 were bent in half flat onto themselves with the coated side facing out at an approximate ¹⁄₁₆" radius of bend. An excellent test rating of 5 requires that the coating remains adherent to the steel without flaking or spalling at the bend. The stainless steel samples coated as described in examples 11–14 received a rating of 5 in the bend test.

EXAMPLE 15

Olsen Cup Test

The Olsen Cup Test is performed on the coated sample using an approximately 1-inch diameter ball, with the ball contacting the uncoated side of the sample. The test is run to tearing of the stainless steel substrate, the depth of penetration is recorded. The test is then repeated on the same sample to 90% of the failure depth. An excellent test rating of 5 requires that the coating remains adherent to the steel with no or very little cracking and peeling near or on the cup of either the torn or 90% sample. Stainless steel samples coated as described in examples 11–14 received a rating of 5 in the Olsen Cup test.

EXAMPLE 16

Scribed X Test

A coated sample is scribed through the coating to the stainless steel substrate with a carbide tip in the shape of an "X", two to three inches long and tested according to ASTM B-117. An excellent test rating of 5 requires no rusting at all in the score mark or at any other defects on the sample (excluding the edges).

Stainless steel samples coated as described in examples 11–14 were run up to 15 days in the ASTM B-117 salt fog and showed no evidence of any corrosion in the score mark or at any other defect in the sample.

The highest rating described by ASTM B-117 standards is a Class A coating. Such a coating is defined as being corroded in the score mark with less than a ¹⁄₃₂" corrosion undercutting into the coated area adjacent to the score mark. ASTM B-117 has no higher rating into which the stainless steel samples coated as described in examples 11–14 could be classified since the excellent rating requires no corrosion in the score mark or at any other defect in the sample.

The present invention has been described with reference to specific details of particular embodiments thereof. It is not intended that such details be regarded as limitations upon the scope of the invention except insofar as and to the extent that they are included in the accompanying claims.

What is claimed is:

1. A method of coating a stainless steel substrate comprising applying to the stainless steel substrate an aqueous coating composition comprising a mixture of:
   (a) at least one water-soluble alkali metal silicate; and
   (b) an effective amount of a water-soluble crosslinking agent comprising an alkali metal aluminophosphate, an alkali metal aluminoborophosphate, an ammonia aluminophosphate, an ammonia aluminoborophosphate, an alkali metal ammonia aluminophosphate, an alkali metal ammonia aluminoborophosphate or a mixture of two or more of the foregoing phosphates.

2. The method of claim 1 further comprising the step of subjecting the coated stainless steel substrate to curing by air or heating to a temperature of up to 240° C.

3. The method of claim 1, wherein the weight ratio of solids of the water-soluble alkali metal silicate to the water-soluble crosslinking agent is in the range of 3:1 to 500:1.

4. The method of claim 3, wherein the combined solids of the water-soluble alkali metal silicate and the water-soluble crosslinking agent in the coating composition is from about 5 wt. % to about 75 wt. %.

5. The method f claim 1, wherein the aqueous coating composition further comprises from about 25 wt. % to about 95 wt. % water.

6. The method of claim 1, wherein the water-soluble crosslinking agent is in an aqueous solution with a pH of at least 5.0.

7. The method of claim 1, wherein the aqueous coating composition further comprises one or more selected from the group consisting of calcium carbonate, pigments, dyes, defoamers, graphite, wetting agents, lubricating additives, water-repellent additives, fillers, resins, conductors and humectants.

8. The method of claim 7, wherein the fillers calcium, carbonate, wetting agents and lubricating additives are each present at up to 60 wt. %, the humectants are present at up to 70 wt. %, the conductors are present at up to 70 wt. %, the resins are present at up to 90 wt. %, the fillers are present at up to 60 wt. % and the pigments are present at up to 50 wt. % of the coating composition.

9. The method of claim 7, wherein the fillers are one or more selected from the group consisting of silica, feldspar, mica, clays, wallsonite, alumina, zirconia, graphite, silicon carbide, oxide glasses, silver, steel, and iron.

10. The method of claim 7, wherein the pigments are selected from the group consisting of organic pigments and inorganic pigments.

11. The method of claim 1, wherein the alkali metal of the water-soluble alkali metal silicate and each of the alkali metals of the water-soluble crosslinking agent independently comprise sodium, potassium or lithium.

12. The method of claim 1, wherein the aqueous coating composition comprises from about 25 wt. % to about 95 wt. % of a low vapor pressure liquid and less than 1.0 wt. % water.

13. The method of claim 12, wherein the low vapor pressure liquid is one or more polyols.

14. The method of claim 13, wherein the polyols are one or more selected from the group consisting of glycerine, ethylene glycol, propylene glycol, diethylene glycol and dipropylene glycol.

15. The method of claim 1, wherein the stainless steel substrate is in the form of a rolled sheet.

16. The method of claim 15, wherein the rolled sheet has a thickness of at least 0.01 inches and not greater than 1 inch.

17. The method of claim 2, wherein the coating film resulting from curing the coated substrate has a film thickness of at least 0.1 mil and not more than 5 mil.

18. A coated stainless steel produced by the method of claim 2.

19. The coated stainless steel of claim 18 used to make one or more selected from the group consisting of automotive body parts, automotive exhaust system parts, appliance parts, architectural stainless steel and structural stainless steel.

20. The method of claim 2, wherein the cured coating composition is an electrical insulating coating on the stainless steel substrate.

21. A coated stainless steel produced by the method of claim 20.

22. The coated stainless steel of claim 21 used to make one or more selected from the group consisting of face plates and computer parts.

23. The method of claim 1, wherein the coating composition is applied as a coating selected from the group consisting of a single coating, an under coating and a top coat.

24. The method of claim 1, wherein the coating composition is applied by roll coating or spray coating.

25. The method of claim 1, wherein the coating is applied before the stainless steel substrate is subjected to one or more processing steps selected from the group consisting of forming, drawing, working, cutting, scratching, bending and welding.

26. The method of claim 1, wherein the coating composition comprises a humectant and the coating composition is applied using silk screening techniques.

27. The method of claim 26, wherein the humectant is glycerin.

28. The method of claim 26, wherein the humectant is added to the coating composition and a substantially equivalent weight of water is removed from the coating composition.

29. A coated stainless steel comprising:
(a) a stainless steel substrate; and
(b) a coating film formed by:
  (1) applying to the stainless steel substrate an aqueous coating composition comprising a mixture of:
    (i) at least one water-soluble alkali metal silicate; and
    (ii) an effective amount of a water-soluble crosslinking agent comprising an alkali metal aluminophosphate, an alkali metal aluminoborophosphate, an ammonia aluminophosphate, an ammonia aluminoborophosphate, an alkali metal ammonia aluminophosphate, an alkali metal ammonia aluminoborophosphate or a mixture of two or more of the foregoing phosphates; and
  (2) curing the coating composition in (1) by subjecting the coated stainless steel substrate to curing by air or heating to a temperature sufficient to cure the coating composition.

30. The coated stainless steel of claim 29, wherein the temperature in (2) is up to 240° C.

31. The coated stainless steel of claim 29, wherein the weight ratio of solids of the water-soluble alkali metal silicate in (i) to the water-soluble crosslinking agent in (ii) is in the range of 3:1 to 500:1.

32. The coated stainless steel of claim 29, wherein the water-soluble crosslinking agent of (ii) is in an aqueous solution with a pH of at least 5.0.

33. The coated stainless steel of claim 29, wherein the aqueous coating composition of (1) further comprises one or more selected from the group consisting of talc, calcium carbonate, micas, silicas, pigments, dyes, defoamers, graphite, wetting agents, clays, lubricating additives, water-repellent additives, fillers, resins, conductors and humectants.

34. The coated stainless steel of claim 33, wherein the fillers are one or more selected from the group consisting of silica, clays, feldspar, mica, wallsonite, alumina, zirconia, graphite, silicon carbide, oxide glasses, silver, steel, and iron.

35. The coated stainless steel of claim 33, wherein the fillers, calcium carbonate, graphite, wetting agents and lubricating additives are each present at up to 60 wt. %, the humectants are present at up to 70 wt. %, the conductors are present at up to 70 wt. %, the resins are present at up to 90 wt. %, the fillers are present at up to 60 wt. % and the pigments are present at up to 50 wt. % of the aqueous coating composition.

36. The coated stainless steel of claim 33, wherein the pigments are selected from the group consisting of organic pigments and inorganic pigments.

37. The coated stainless steel of claim 29, wherein the alkali metal of the water-soluble alkali metal silicate and each of the alkali metals of the water-soluble crosslinking agent independently comprise sodium, potassium or lithium.

38. The coated stainless steel of claim 29, wherein the aqueous coating composition further comprises from about 25 wt. % to about 95 wt. % water.

39. The coated stainless steel of claim 29, wherein the aqueous coating composition comprises from about 25 wt. % to about 95 wt. % of a low vapor pressure liquid and less than 1.0 wt. % water.

40. The coated stainless steel of claim 39, wherein the low vapor pressure liquid is one or more polyols.

41. The coated stainless steel of claim 40, wherein the polyols are one or more selected from the group consisting of glycerine, ethylene glycol, propylene glycol, diethylene glycol and dipropylene glycol.

42. The coated stainless steel of claim 29, wherein the stainless steel substrate is in the form of a rolled sheet.

43. The coated stainless steel of claim 42, wherein the rolled sheet has a thickness of at least 0.01 inches and not greater than 1 inch.

44. The coated stainless steel of claim 29, wherein the coating film of (b) has a film thickness of at least 0.1 mil and not more than 5 mil.

45. The coated stainless steel of claim 29 used to make one or more selected from the group consisting of automotive body parts, automotive exhaust system parts, appliance parts, architectural stainless steel and structural stainless steel.

46. The coated stainless steel of claim 29, wherein the cured coating composition is an electrical insulating coating on the stainless steel substrate.

47. The coated stainless steel of claim 46 used to make one or more selected from the group consisting of face plates and computer parts.

48. The coated stainless steel of claim 29, wherein the coating composition is applied as a coating selected from the group consisting of a single coating, an under coating and a top coat.

49. The coated stainless steel of claim 29, wherein the coating composition is applied by roll coating or spray coating.

50. The coated stainless steel of claim 29, wherein the coating is applied before the stainless steel substrate is subjected to one or more processing steps selected from the group consisting of forming, drawing, working, cutting, scratching, bending and welding.

51. The coated stainless steel of claim 29, wherein the coating composition comprises a humectant and the coating composition is applied using silk screening techniques.

52. The method of claim 51, wherein the humectant is glycerin.

* * * * *